May 6, 1969     R. J. PURVEY     3,442,577

SLIDE PROJECTOR FOCUSING MECHANISM

Filed Dec. 16, 1966

United States Patent Office 3,442,577
Patented May 6, 1969

3,442,577
SLIDE PROJECTOR FOCUSING MECHANISM
Ronald James Purvey, Shirley, Solihull, England, assignor to The Rank Organisation Limited, London, England, a British company
Filed Dec. 16, 1966, Ser. No. 602,277
Claims priority, application Great Britain, Dec. 17, 1965, 53,695/65
Int. Cl. G03b *21/00*
U.S. Cl. 350—255     5 Claims

ABSTRACT OF THE DISCLOSURE

A focusing mechanism including a sleeve, a lens mount slidably movable within the sleeve, and a detent engaging a helical groove in the lens mount. The mechanism also includes a reaction pad which is so dimensioned that it cannot enter the helical groove. Both the detent and the pad are carried by an arcuate spring clip so that there are no resultant side loads on the lens mount.

---

The present invention concerns focusing mechanisms, and is particularly but not exclusively concerned with focusing mechanisms for use in slide projectors.

According to this invention there is provided a focusing mechanism comprising a sleeve, a lens mount slidably located within said sleeve, and a detent engaging in a helical groove in said lens mount.

Preferably a reaction pad is provided, which is so dimensioned that it cannot enter said helical groove, and both said detent and said pad may be carried by an arcuate spring clip so that there are no resultant side loads on the lens mount.

Figure 1:
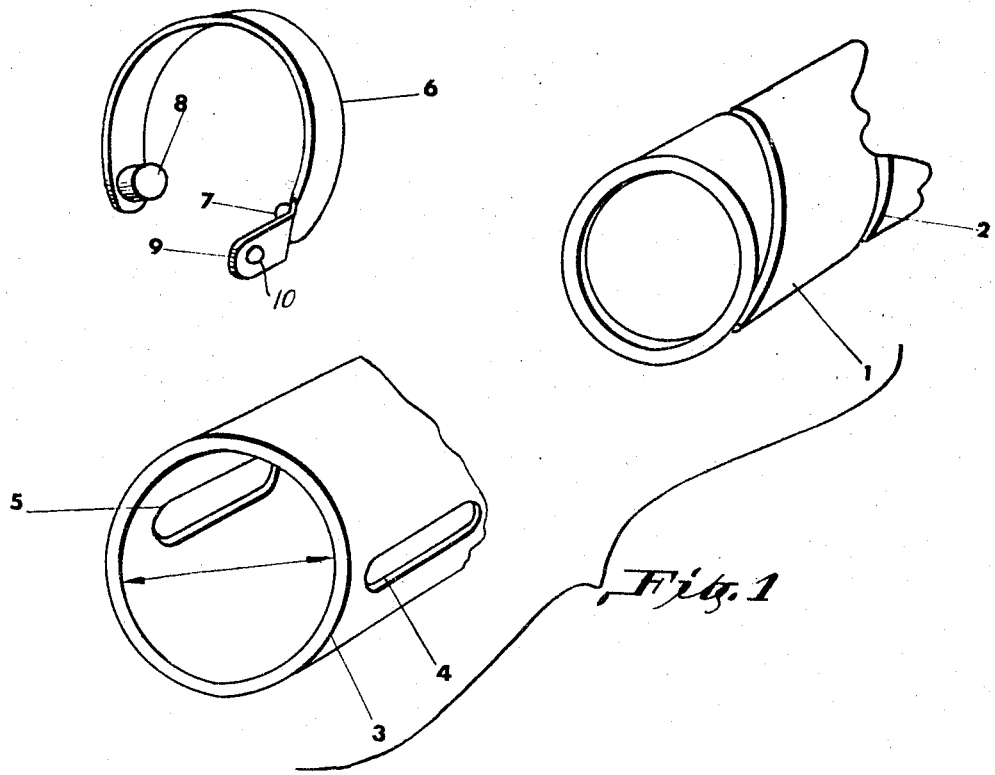
Figure 2:
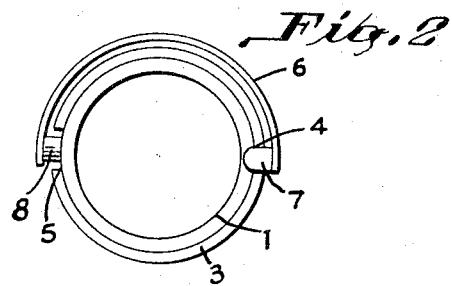

One embodiment of a focusing mechanism according to the present invention will now be particularly described hereinafter by way of example and with reference to the accompanying drawings, in which:

FIGURE 1 is a perspective view of the component parts of a focusing mechanism constructed in accordance with the present invention, and FIGURE 2 is a cross-section of the focusing mechanism of FIGURE 1, when assembled, taken through the spring clip.

The focusing mechanism shown in the accompanying drawings comprises a cylindrical projection lens mount 1 having a helical groove 2 formed in its outer surface and which is slidably mounted within a fixed sleeve 3, forming part of the housing of a projector, not shown. The sleeve 3 is provided with two longitudinal slots 4 and 5, and an arcuate spring clip 6 embraces the sleeve 3 and has a detent 7 and a reaction pad 8 extending respectively through the slots 4 and 5. The resilience of the spring clip 6 causes the detent 7 and pad 8 to engage the lens mount 1 with a clamping effect. The detent 7 projects beyond the sleeve 3 and engages with the helical groove 2 in the lens mount 1, whilst the reaction pad 8 is so dimensioned that it is too large to enter the groove 2. The spring clip 6 carries a bracket 9 by means of which it can be connected to any suitable automatic or remote focusing control mechanism to be moved along the slot 4.

It will be seen that the position of the lens mount 1 can be adjusted in two different ways. In the first case coarse adjustment of the focus can be obtained by rotating the lens mount 1 manually, in which case the action between the groove 2 and the detent 7 will cause corresponding axial adjustment of the lens mount 1: the clamping action of the spring clip 6 together with the restraint provided by the remote or automatic focusing control mechanism, not shown, is sufficient to maintain the clip 6 in its position, causing the lens mount 1 to move in or out of the sleeve 3. On the other hand the bracket 9 can be moved longitudinally for fine adjustment by the automatic or remote focusing control mechanism, not shown, also causing corresponding axial movement of the lens mount 1. Rotary movement at the bracket 9 causes the spring clip 6 to oscillate about the detent 7 and pad 8. The fine focusing movement of the lens mount 1 is imparted to the clip 6 either by means of an eccentric (not shown) connected to the bracket 9 or by axial movement.

Bracket 9 and clip are fixed together and will normally be one component. If the prime mover is an eccentric, the bracket 9 acts as a crank imparting axial movement at 7 and 8 from rotary movement of the eccentric in the hole 10 in the bracket.

The construction described has several advantages; in particular, the reaction to the detent load is supplied by a component which moves with the lens mount 1 so that no detent friction has to be overcome by the focusing motor which can therefore be small. Furthermore, the positional location of the lens mount in the sleeve 3 allows minimal deviation from true axial movement. This is difficult to achieve with lens carriers relying on spring locations or small area supports. No intermediate liner or carrier is required as on other methods and construction and assembly of the focusing mechanism is accordingly very simple. The removal or insertion of the lens requires no operation of controls and the low cost of the mechanism enables it to be used on models which do not require automatic or remote focusing. This is in the interests of production standardization.

Finally there is no backlash because there is no relative movement between the lens holder 1 and the detent 7 and pad 8 during fine focusing.

I claim:
1. A focusing mechanism comprising the combination of a sleeve, a lens mount slidably located within the sleeve and provided with a helical groove, a detent carried by the sleeve, yielding means serving to bias the detent to cause it to enter the groove, and a reaction pad which is so dimensioned that it will be unable to enter the said helical groove and which is so situated as to oppose lateral pressure of the detent on the said lens mount in order that there will be substantially no end-loads on the lens mount.

2. A mechanism as claimed in claim 1 in which said detent and said pad are carried by an arcuate spring clip.

3. A mechanism according to claim 2 in which the spring clip is arranged to embrace the said sleeve, and in which the sleeve is provided with an aperture through which said detent can project to engage within said helical groove.

4. A mechanism according to claim 3 in which the said sleeve is provided with a second aperture through which said reaction pad can extend to engage the surface of said lens mount.

5. A mechanism according to claim 4 in which said apertures in the sleeve are constituted by slots each extending lengthwise along the sleeve.

References Cited

UNITED STATES PATENTS

| 1,649,646 | 11/1927 | Badgley | 350—255 |
| 2,407,511 | 9/1946 | Peck | 350—255 |
| 3,301,129 | 1/1967 | Henriksen | 88—28 |

FOREIGN PATENTS 593,721    3/1960    Canada.

NORTON ANSHER, *Primary Examiner.*

RICHARD M. SHEER, *Assistant Examiner.*

U.S. Cl. X.R.
350—255; 353—101